United States Patent
Datta et al.

(10) Patent No.: US 7,655,730 B2
(45) Date of Patent: *Feb. 2, 2010

(54) TRANSPARENT POLYOLEFIN COMPOSITIONS

(75) Inventors: Sudhin Datta, Houston, TX (US);
Weiguo Hu, Hudson, OH (US); Kristina Mary Kwalik, League City, TX (US);
Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/402,333

(22) Filed: Apr. 11, 2006

(65) Prior Publication Data

US 2006/0235159 A1  Oct. 19, 2006

Related U.S. Application Data

(60) Provisional application No. 60/671,219, filed on Apr. 14, 2005.

(51) Int. Cl.
*C08L 23/00* (2006.01)
*C08L 23/04* (2006.01)
*C08L 23/10* (2006.01)
*C08G 18/42* (2006.01)
*C08K 5/00* (2006.01)

(52) U.S. Cl. ............... 525/191; 525/240; 524/500; 524/515

(58) Field of Classification Search .......... 525/191, 525/240; 524/500, 515
See application file for complete search history.

(56) References Cited

U.S. PATENT DOCUMENTS 5,317,070 A    5/1994  Brant et al. ........... 526/348.5
6,500,563 B1   12/2002 Datta et al. ........... 428/521
6,642,316 B1   11/2003 Datta et al. ........... 525/240
6,747,114 B2 * 6/2004  Karandinos et al. ..... 526/348.2
2006/0100379 A1 * 5/2006 Ouhadi .................. 525/240

FOREIGN PATENT DOCUMENTS

| EP | 0 374 695 | 6/1990 |
|---|---|---|
| EP | 0 964 641 | 7/1998 |
| EP | 0 946 640 | 10/1999 |
| EP | 0 969 043 | 1/2000 |
| EP | 1 098 934 | 1/2000 |
| EP | 1 003 814 | 5/2000 |
| WO | WO 00/69963 | 11/2000 |
| WO | WO 03/040233 | 5/2003 |
| WO | WO 2004/014988 | 2/2004 |
| WO | WO 2004/060994 | 7/2004 |
| WO | WO 2004/087806 | 10/2004 |

OTHER PUBLICATIONS

Macromolecules 32 (1999), 4686-4691, entitled "Calibration of $^1$H NMR Spin Diffusion Coefficients for Mobile Polymers through Transverse Relaxation Measurements", Mellinger et al., Germany.
Abstract for JP 08253633, published Oct. 1, 1996 entitled "Drawn Polypropylene Film", Inventor: Saito Noriaki.
Abstract for JP 2000072938, published Mar. 7, 2000, entitled "Polyolefin Resin Composition, Its Sheet and Its Molded Article", Inventor: Okamoto Takeshi.
Abstract for JP 2002241432, published Aug. 28, 2002, entitled "Elastic Polypropylene and Its Manufacturing Method", Inventor: Chisso Sekiyu Kagaku KK.
Abstract for JP 2003073426, published Mar. 12, 2003, entitled "Propylene Random Copolymer", Inventor: Mogi Manabu.

* cited by examiner

*Primary Examiner*—Nathan M Nutter

(57) ABSTRACT

Disclosed herein are various compositions, including a transparent compositions comprising propylene-based polymers and a hydrocarbon resin.

23 Claims, No Drawings

TRANSPARENT POLYOLEFIN COMPOSITIONS

This application claims the benefit of Provisional Application No. 60/671,219 filed Apr. 14, 2005, the disclosure of which is incorporated by reference.

BACKGROUND

Transparent thermoplastic polymer blend compositions for use in molded and extruded articles are disclosed herein.

A variety of transparent thermoplastic compositions have been developed, some of which have been disclosed in the patent literature and/or introduced to the marketplace. Each of those compositions has a particular level of transparency, often characterized in terms of "haze," which is expressed as (%) in accordance with recognized test procedures. Shortcomings of those compositions include unsatisfactorily high haze values (low transparency), poor processability and poor mechanical properties, including undue hardness, low flexibility, etc. For example, previously proposed thermoplastic elastomer compositions with transparency and flexibility such as compounds based on styrene-ethylene-butadiene-styrene block copolymers, thermoplastic vulcanizate blends (TPV) or thermoplastic olefin (TPO) blends have reached transparency and softness levels that are still unsatisfactory in some applications.

It is among the objects of the invention to provide a transparent material that has a desirable balance of softness, flexibility and strength, and which can be easily processed in a molten state in extrusion or molding.

Polymer blends prepared for various applications are known. Adhesive blends that include hydrocarbon resins are disclosed in WO 04/087806. In Example 4 certain compositions include hydrocarbon resin with Tg>20° C. blended with two different types of polypropylenes, namely, minor amounts of polypropylene having a Tm≧110° C. and major amounts (72 wt % and above) of propylene-ethylene copolymer that has isotactically arranged propylene derived sequences and Tm<105° C.

U.S. Pat. No. 5,317,070 also discloses adhesive compositions that include a hydrocarbon resin with high glass transition temperature, but the polymers with which the compositions are blended are different from the polypropylenes claimed herein. U.S. Pat. No. 6,500,563 discloses blends of two different types of polypropylene, including blends made from a polypropylene having a Tm≧110° C. and propylene-ethylene copolymer that has isotactically-arranged propylene-derived sequences and Tm<105° C.

Three component blends of isotactic polypropylene, impact modifying amounts of an ethylene propylene based rubber or low density ethylene copolymer and a propylene-based elastomer as compatibilizer are described in EP946640, EP964641, EP969043 and EP1098934.

WO 04/014988 describes blends of isotactic polypropylene with non-functionalized plasticizers such as poly-alpha-olefins. WO 04/060994 describes blends of polypropylene and propylene-based elastomers to provide flexibility. WO03/040233 discloses two component blends with the isotactic polypropylene as the predominant, matrix phase and the propylene-based copolymer serving as an impact modifier. EP1003814 and U.S. Pat. No. 6,642,316 disclose two-component blends of small amounts of isotactic polypropylene and predominant amounts of an ethylene-based elastomer. EP374695 Example 5 discloses visually homogeneous two component blends however using 40 wt % or less of the propylene-based copolymer. WO00/69963 describes films made of two—component blends with from 75 to 98 wt % of a propylene ethylene based elastomer having a heat of fusion of less than 25 J/g. A process oil may be present.

Others have attempted to make transparent compositions, but many of such compositions are problematic, particularly when attempting to make molded compositions that possess a desirable array of properties, such as softness, flexibility and strength, while also having good processability. For example, others have been confronted with shortcomings in the area of processability, particularly for molded or extruded compositions, where the tendency for a material to crystallize quickly has enormous advantages. Many materials that have good mechanical properties lack good crystallization properties. When a composition is used for molding, it is desirable that it have a tendency to flow well and thus quickly and easily and completely fill all areas of the mold. While there is a general tendency for higher MFR materials to correspond to good flowability, a higher MFR is frequently also accompanied by an unfortunate decrease in mechanical properties; thus a higher MFR is not necessarily desirable for that reason. Furthermore, many compositions experience a trade-off in properties, e.g., where good mechanical properties may be offset by poor flexibility, e.g., undue stiffness or hardness. Accordingly, there is a need for a material that has a combination of desirable properties.

The compositions of the present invention combine the ease of fabrication by molding processes such as thermoforming, blow molding or injection molding or extrusion processes with transparency and elasticity. These primary properties are combined with the ability to vary the tensile strength and the hardness by the changes in the composition particularly in the balance of the FPC and the SPC as well as the MFR of the SPC. There is a need in the art for such elastic and transparent polyolefin compositions which can be easily fabricated.

SUMMARY

In one embodiment, the compositions disclosed herein comprise a first polymer component (FPC) comprising propylene, the FPC having a MFR @230° C.≧about 25 g/10 min. and a melting temperature of ≧about 110° C.; a second polymer component (SPC) comprising propylene having a heat of fusion<75 J/g and a triad tacticity of from about 50% to about 99%, the SPC having an MFR @230° C.≦about 800 g/10 min.; and optionally, a hydrocarbon resin.

In another embodiment the compositions described herein comprise a first polymer component (FPC) comprising propylene, the FPC having a MFR @230° C.≧about 25 g/10 min. and a melting temperature of ≧about 110° C.; a second polymer component (SPC) comprising 6-25 wt % ethylene and 75-94 wt % propylene based on the weight of propylene and ethylene, the SPC having a triad tacticity of from about 50% to about 99% and MFR @230° C.≦about 800 g/10 min.; and optionally, a hydrocarbon resin.

In yet another embodiment, the compositions described herein comprise (a) a first polymer component (FPC) comprising isotactic polypropylene having at least 90 wt % propylene, the FPC having a MFR @230° C.≧about 25 g/10 min. and a melting temperature of ≧about 110° C.; (b) a second polymer component (SPC) comprising from about 7.5 to about 17.5 wt % ethylene and from about 82.5 to about 92.5 wt % propylene based on the weight of propylene and ethylene in the SPC, the SPC having (i) a heat of fusion<75 J/g; (ii) a triad tacticity of from about 50% to about 99%, (iii) MFR @230° C.≦about 25 g/10 min., (iv) MWD of from about 1.5 to about 3.5; and (v) a melting temperature less than about 105° C.; and optionally, a hydrocarbon resin having an initial YI color of ≦about 5.

DETAILED DESCRIPTION

It is desirable for a composition to be transparent, and also to have other beneficial properties. Accordingly, compositions disclosed herein are not only highly transparent, with a haze value of 50% and below, e.g., down to 30% or below, or 15% or below. In some embodiments these composition may also be soft, with a Shore A Hardness of 90 and below, e.g., down to 80 or below, or 70 or below, or 60 or below. Furthermore, the compositions are also flexible and have excellent processability as well as other desirable properties, as noted below.

First Polymer Component (FPC)

As discussed herein, a "first polymer component" (FPC), which broadly can be any "thermoplastic component," is any material that is not a "rubber" and that is a polymer or polymer blend considered by persons skilled in the art as being thermoplastic in nature, e.g., a polymer that softens when exposed to heat and returns to its original condition when cooled to room temperature. Preferably, the FPC is a polypropylene having one of the compositions and melting points disclosed below. The FPC is regarded as semi-crystalline and contributes to strength but also to hardness.

The FPC (thermoplastic component) may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers. The predominant monomer may be propylene which is then present in amounts greater than about 25 wt %, and preferably at least 90 wt %. The crystallinity is preferably of the isotactic propylene type. The comonomer may be selected from alpha-olefins having from 3 to 12 carbon atoms, or preferably from 4 to 10 carbon atoms or from copolymerizable monomers having a carbonyl moiety. Illustrative polyolefins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the thermoplastic component contains one or more polypropylene homopolymers, polypropylene copolymers, or a combination thereof. The thermoplastic component may be added to the composition alone, or as a blend of two or more polyolefins. Preferably, the thermoplastic component is unvulcanized or non cross-linked.

In one or more embodiments, the FPC contains one or more propylene homopolymers, propylene block copolymers, propylene copolymers, or a combination of one or more thereof. Preferred propylene copolymers include, but are not limited to, terpolymers of propylene, impact copolymers of propylene, random copolymers of propylene and mixtures thereof. Such propylene copolymers and methods for making the same are described in U.S. Pat. No. 6,342,565.

In certain embodiments, the FPC comprises polypropylene. The term "polypropylene" as used herein broadly means any polymer that is considered a "polypropylene" by persons skilled in the art (as reflected in at least one patent or publication), and includes homo, impact, random, and isotactic propylene polymers. The term "random polypropylene" as used herein broadly means a single phase propylene copolymer having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene. Preferably, the polypropylene used in the compositions described herein has a melting point above about 110° C., includes at least 90 wt % propylene units, and contains isotactic sequences of those units. Alternatively, the polypropylene may include atactic sequences or syndiotactic sequences. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ α-olefins.

As noted elsewhere herein, certain polypropylenes have a high MFR, and others have a lower MFR, e.g., "fractional" polypropylenes which have an MFR less than 1.0. Those with high MFR may be preferred for ease of processing or compounding. For example, in some embodiments, the FPC has an MFR≧about 25 g/10 min., more preferably ≧about 27 g/10 min., more preferably ≧about 30 g/10 min. A preferred polypropylene is isotactic polypropylene. An illustrative isotactic polypropylene has a weight average molecular weight from about 200,000 to about 600,000, and a number average molecular weight from about 80,000 to about 200,000. A more preferable isotactic polypropylene has a weight average molecular weight from about 300,000 to about 500,000, and a number average molecular weight from about 90,000 to about 150,000. In one or more embodiments, the isotactic polypropylene has a molecular weight distribution (Mw/Mn) (MWD), also referred to as "polydispersity index" (PDI), within a range having a low of 1.5, 1.8. or 2.0 and a high of 4.5, 5, 10, 20, or 40.

The isotactic polypropylene preferably has a melt temperature ($T_m$) ranging from a low of 150° C., 155° C., or 160° C. to a high of 160° C., 170° C., or 175° C. The isotactic polypropylene preferably has a glass transition temperature ($T_g$) ranging from a low of −5° C., −3° C., or 0° C. to a high of 2° C., 5° C., or 10° C. The crystallization temperature ($T_c$) of the isotactic polypropylene component preferably ranges from a low of about 95° C., 100° C., or 105° C. to a high of about 110° C., 120° C. or 130° C., as measured by differential scanning calorimetry (DSC) at 10° C./min. Furthermore, the isotactic polypropylene preferably has a crystallinity of at least 25%, more preferably at least 35%, more preferably at least 50%, more preferably at least 65% as measured by DSC. A preferred isotactic polypropylene has a heat of fusion of greater than 75 J/g, or greater than 80 J/g, or greater than 90 J/g. The isotactic polypropylene has a density of from about 0.85-0.93 g/cc, more preferably of from about 0.88-0.92 g/cc, and more preferably from about 0.90-0.91 g/cc.

The isotactic polypropylene may be synthesized using any polymerization technique known in the art such as, but not limited to, the "Phillips catalyzed reactions," conventional Ziegler-Natta type polymerizations, and single-site organometallic compound catalysis, such as metallocene catalysis, for example. Illustrative metallocene catalyst compounds include, but are not limited to, the reaction products of metallocene-alumoxane and metallocene-ionic activator reagents. Illustrative polymerization methods include, but are not limited to, slurry, bulk phase, solution phase, and any combination thereof. Polymerization may be carried out by a continuous or batch process in a single stage, such as a single reactor, or in two or more stages, such as in two or more reactors arranged in parallel or series.

Second Polymer Component (SPC)

As discussed herein, a "second polymer component" (SPC) is preferably a propylene polymer, preferably having ≧60 wt % units derived from propylene, including isotactically arranged propylene derived sequences and also preferably having one of the melting points or heats of fusion disclosed below, e.g., Tm less than 105° C. or a heat of fusion less than 75 J/g, or both. The SPC has a low crystallinity (2-65%) and can be regarded as an elastomer. It contributes towards the flexibility and softness.

Preferably, the SPC is a "propylene copolymer." A "propylene copolymer" includes at least two different types of monomer units, one of which is propylene. Suitable monomer units include, but are not limited to, ethylene and higher α-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units on the polymer chain derived from ethylene monomers). The SPC may also comprises diene units, e.g., non-conjugated diene units such as (but not limited to) 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD).

The SPC preferably contains ≧60 wt %, more preferably ≧75 wt % propylene-derived units. In some embodiments, the SPC comprises from 75-95 wt % of propylene-derived units, more preferably from 80-90 wt % of propylene-derived units, the balance comprising one or more alpha olefins. Other suitable embodiments include propylene derived units in an amount (based on the weight of propylene and alpha olefin) ranging from about 75-93 wt %, more preferably about 75-92.5 wt %, more preferably about 75-92 wt %, more preferably 75-92.5 wt %, more preferably 82.5-92.5 wt %, and more preferably about 82.5-92 wt %. Corresponding alpha-olefin ranges include 5-25 wt %, more preferably 7-25 wt %, more preferably 7.5-25 wt %, more preferably 7.5-17.5 wt % and more preferably 8-17.5 wt % (based on the weight of propylene and alpha olefin). Preferred alpha olefins are ethylene, butane, hexene, octene, or combinations of two or more thereof, such that the combined weight of the two or more alpha olefins is greater than or equal to 5 wt %.

Preferably, the SPC has crystalline regions interrupted by non-crystalline regions. The non-crystalline regions may result from regions of non-crystallizable polypropylene segments, the inclusion of comonomer units, or both. The SPC has a propylene-derived crystallinity that is isotactic, syndiotactic, or a combination thereof and preferably has isotactic sequences. The presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences.

In some embodiments, the propylene-derived units of the SPC have an isotactic triad fraction of about 65% to about 99%, more preferably 70-97% and more preferably 75-97%. In other embodiment, the SPC has a triad tacticity as measured by $^{13}C$ NMR, of 75% or greater, 80% or greater, 82% or greater, 85% or greater, or 90% or greater.

The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the SPC. The triad tacticity (mm fraction) of a propylene copolymer can be determined from a $^{13}C$ NMR spectrum of the propylene copolymer and the following formula:

$$mm\text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

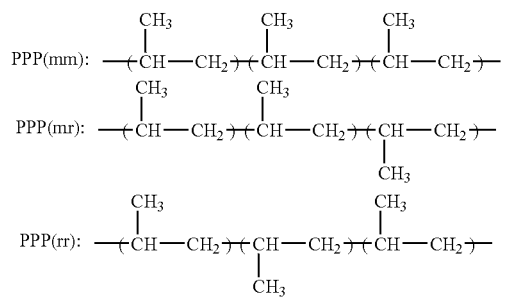

The $^{13}C$ NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

Due to the introduction of errors in the insertion of propylene and/or by the presence of comonomer, the crystallinity and the melting point of the SPC are reduced compared to highly isotactic polypropylene. For example, the propylene-derived crystallinity of the SPC may range from about 2-65%, more preferably from about 5-40% as measured by Differential Scanning Calorimetry (DSC).

Melting point (Tm), heat of fusion (Hf) and % crystallinity are/were determined using the following procedure. ASTM E 793-01 and ASTM E 794-01 are used as references. Differential scanning calorimetric (DSC) data was obtained using a Perkin-Elmer Pyris 1 DSC machine. Preferably, about 0.5 g of the polymer to be tested is weighed out and pressed to a thickness of about 15-20 mils at approximately 140° C. to 150° C., using a "DSC mold" and Mylar as a backing sheet. This pressed pad is allowed to cool to ambient temperature by hanging in air (the Mylar is not removed), and annealed at room temperature for 1 overnight period. At the end of this period, an approximately 15 to 20 mg disc is removed from the pressed pad using a punch die and placed into a crimped 10 microliter aluminum sample pan. The sample pan is placed into the DSC machine and quickly cooled to −100° C. (not recorded) and held isothermally for about 3 minutes. The sample is then gradually heated to 200° C. at a rate of 10° C./minute, and the data recorded. The sample is kept at 200° C. for 5 minutes before a second cooling-heating cycle is applied at a rate of 10° C./min and also recorded. Areas under the melting curves are measured and used to determine the heat of fusion and the degree of crystallinity. The % crystallinity (X %) is calculated using the formula, X %=[area under the curve (Joules/gram)/B (Joules/gram)]*100, where the area under the curve is the heat of fusion of the sample and B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature and heat of fusion are typically measured and reported during the second heating cycle (or second melt). For the semi-amorphous polymers, having comparatively low levels of crystallinity, the melting temperature and heat of fusion are typically measured and reported during the first heating cycle.

The "melting point" can be measured using the DSC test described above. Using the DSC test, the melting point is the temperature recorded corresponding to the greatest heat absorption within the range of melting temperature of the sample relative to the baseline. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. Furthermore, as with the DSC method, the peak location may be influenced by annealing and relaxation treatments. Therefore, it is recommended that the sample pretreatment procedure stated above for the DSC be followed.

The SPC preferably has a heat of fusion ranging broadly from 1-90 J/g, more preferably 2-40 J/g, more preferably 5-35 J/g, more preferably 7-25 J/g. The SPC preferably has a heat of fusion of $\leq 75$ J/g, more preferably $\leq 50$ J/g, more preferably $\leq 45$ J/g, more preferably $\leq 40$ J/g, more preferably $\leq 35$ J/g.

The SPC may have any one of the following melting points, ranging from a lower limit of 25° C., or 30° C., or 35° C., or 40° C., or 45° C., or 50° C., to a higher limit of 105° C., or 100° C., or 95° C., or 90° C., or 85° C., or 80° C., or 85° C., or 80° C., or 75° C., or 70° C. In other specific embodiments, the melting point of the propylene copolymer can be expressed as any one of a selection of ranges, e.g., ranges of from 30° C. to 70° C. or from 40° C. to 50° C.

The SPC preferably has a MFR $\leq$ about 800 g/10 min., more preferably $\leq$ about 500 g/10 min., more preferably $\leq$ about 200 g/10 min., more preferably $\leq$ about 100 g/10 min., more preferably $\leq$ about 50 g/10 min. Particularly preferred embodiments include an SPC with an MFR of from about 1-25 g/10 min., more preferably about 1-20 g/10 min. The SPC preferably has a melt index (MI) in g/10 min (2.16 kg @190° C.) according to ASTM 1238 (B) of less than 7, more preferably less than or equal to 6.5, more preferably less than or equal to 6, more preferably less than or equal to 5.5, and more preferably less than or equal to 5.

In a preferred aspect, the propylene-derived crystallinity is selected relative to any polypropylene resin present in the FPC. In some embodiments, the tacticity of the SPC and the tacticity of the FPC (which may include two or more different polypropylene polymers) may be the same or substantially the same. By "substantially" it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the %ages in each should be at least about 80% the same as the other component in at least one or more embodiments.

In one or more embodiments, the SPC is made using random polymerization methods, including those described in U.S. Pat. Nos. 6,288,171; 6,525,157; 5,001,205; WO 96/33227; WO 97/22639; U.S. Pat. Nos. 4,543,399; 4,588, 790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-B-634 421. However, the SPC is not limited by any particular polymerization method. Suitable polymerization methods include solution, for example.

The SPC is also not limited by any or any particular type of reaction vessel. The SPC may in certain embodiments be formed in a single reactor. The SPC may in certain embodiments be formed in one or more series reactors (e.g., two or more reactors arranged in series). The SPC may in certain embodiments be formed in a batch reactor. Preferably, the continuous polymerization methods have sufficient back-mixing such that there are no concentration gradients within the reactor. Preferably, the SPC is formed using solution polymerization (as opposed to slurry or gas-phase polymerization) such that the catalyst system exists in a single-phase environment.

Furthermore, the SPC is not limited by any particular catalyst or catalyst system. In one or more embodiments, the catalyst system may include one or more transition metal compounds and one or more activators. Multiple activators may be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, may be used. In one or more embodiments, nonmetallocene, metal-centered, heteroaryl ligand catalyst systems as described in U.S. Patent Application 20030204017 published Oct. 30, 2003, may be used.

Preferably, the SPC may be made in the presence of a metallocene catalyst system. As a non-limiting example, illustrative metallocene catalyst systems may include, but are not limited to, a bis-indenyl compound, particularly a bridged bis-indenyl compound, and even more particularly a bridged bis-indenyl compound without any 2-substitutions. Alternatively, however, in one or more specific embodiments, any SPC used in an elastomeric structure may be prepared using a single site catalyst capable of permitting tactic insertion. For example, in at least certain embodiments, a polymer made in accordance with the disclosure of WO 03/0404201, owned by Dow Chemical Company, may qualify as a "SPC."

In one or more embodiments, the SPC has a Shore A hardness of less than about 90. In one or more embodiments, the SPC a Shore A hardness of about 45 to about 90. In one or more embodiments, the SPC has a Shore A hardness of about 55 to about 80.

In one or more embodiments, the SPC may have a molecular weight distribution (MWD) $M_w/M_n$ ranging from 1.5 to 40; or from 2 to 20; or from 2 to 10; or from 2 to 5; or from 2 to 3.5. In one or more embodiments, the SPC may have a number average molecular weight (Mn) of from 10,000 to 5,000,000; or from 40,000 to 300,000; or from 80,000 to 200,000, as determined by gel permeation chromatography (GPC). In one or more embodiments, the SPC may have a weight average molecular weight ($M_w$) within the range having an upper limit of 5,000,000 or 1,000,000 or 500,000 g/mol, and a lower limit of 10,000, or 15,000, or 20,000, 60,000, 70,000, 75,000 or 80,000 g/mol. Further, the SPC may have a Mooney viscosity (ML (1+4)@125° C.) from a low of 50, or 60, or 75, to a high of 80, or 90, or 100.

Hydrocarbon Resin

The compositions described herein include a hydrocarbon resin, which may be a thermally polymerized dicyclopentadiene resin, preferably hydrogenated to achieve transparency and minimize discoloration. Preferred hydrocarbon resins have an initial YI color (ASTM D-1925) of less than 5, more preferably less than 3, and more preferably less than 1. The hydrocarbon resin may also be a catalytically polymerized resin made using a Friedel-Crafts catalyst such as boron or aluminum halides. The hydrocarbon resin may be a cycloaliphatic resin or contain appropriate levels of aromatics. Preferably, the hydrocarbon resin is miscible with both, or at least one, of the polymer components (FPC and SPC). Also, the hydrocarbon resin itself should be clear, preferably colorless, or transparent; preferably, a water white cycloaliphatic hydrocarbon resin. A particularly preferred hydrocarbon resin is OPPERA RP 104, supplied by ExxonMobil Chemical Co, which has a Tg of 65° C. and a softening point ranging from 119 to 125° C.

In at least certain embodiments, the hydrocarbon resin has a high glass transition temperature Tg, that is higher by at least 1° C. than the Tg of the composition (including process oil if present) when the hydrocarbon resin is absent. Alternatively, in certain embodiments, the Tg of the hydrocarbon resin is higher than the Tg of each of the other individual polymers.

In certain embodiments, the glass transition temperature Tg of the hydrocarbon resin is one within the range having a low of 20° C., or 30° C., or 40° C., and a high of 70° C., or 80° C., or 90° C. One of more of the compositions disclosed herein may include hydrocarbon resin that has a Tg≧20° C. Alternatively, the Tg may be ≧10° C., or ≧30° C., or ≧40° C., or ≧50° C. and the Tg may be ≦60° C., or ≦70° C., or ≦80° C., or ≦90° C.

In certain embodiments, the hydrocarbon resin has a softening point within the range having a lower limit of 80° C., 120° C., or 125° C. and an upper limit of 140° C., 150° C., or 180° C. Softening point (° C.) is measured as a ring and ball softening point according to ASTM E-28 (Revision 1996).

Preferably, the hydrocarbon resin is amorphous and glassy, with low molecular weight. Preferably, the hydrocarbon resin has a lower molecular weight than either of the blend polymers. In certain embodiments, the hydrocarbon resin may have a number average molecular weight (Mn) within the range having an upper limit of 5000, or 2000, or 1000, and a lower limit of 200, or 400, or 500, a weight average molecular weight (Mw) ranging from 500 to 5000, a Z average molecular weight (Mz) ranging from 500 to 10,000, and a polydispersity (PD) as measured by Mw/Mn of from 1.5 to 3.5, where Mn, Mw, and Mz are determined by size exclusion chromatography (SEC).

The hydrocarbon resin should be present in the compositions in an amount ranging from a lower limit of 1%, 5%, or 10% by weight based on the total weight of the composition, to an upper limit of 30%, or 25%, or 20%, or 18%, or 15% by weight based on the total weight of the composition.

A hydrocarbon resin can include any of the following compounds, to the extent they are otherwise appropriate, e.g., having the requisite properties described elsewhere herein. Additionally, they should provide (or at least not reduce) transparency: Examples of hydrocarbon resins include aliphatic hydrocarbon resins, hydrogenated aliphatic hydrocarbon resins, aromatic modified aliphatic hydrocarbon resins, hydrogenated aromatic modified aliphatic hydrocarbon resins, polycyclopentadiene resins, hydrogenated polycyclopentadiene resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, maleic acid/anhydride modified tackifiers, polyterpene resins, hydrogenated polyterpene resins, aromatic modified polyterpene resins, hydrogenated aromatic modified polyterpene resins, terpene-phenol resins, hydrogenated terpene-phenol resins, gum rosin resins, hydrogenated gum rosin resin, gum rosin ester resins, hydrogenated gum rosin ester resins, wood rosin resin, hydrogenated wood rosin resins, wood rosin ester resins, hydrogenated wood rosin ester resins, tall oil rosin resins, hydrogenated tall oil rosin resins, tall oil rosin ester resins, hydrogenated tall oil rosin ester resins, rosin acid resins, hydrogenated rosin acid resins, and mixtures of two or more thereof.

Specific examples of commercially available hydrocarbon resins include Oppera PR 100, 101, 102, 103, 104, 105, 106, 111, 112, 113, 115, and 120 hydrocarbon resins, all available from ExxonMobil Chemical Company, ARKON™ M90, M100, M115 and M135 and SUPER ESTER™ rosin esters available from Arakawa Chemical Company of Japan, SYLVARES™ phenol modified styrene- and methyl styrene resins, styrenated terpene resins, ZONATAC terpene-aromatic resins, and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTAC™ C5/C9 resins, REGALITE™ and REGALREZ™ aromatic and REGALITE™ cycloaliphatic/aromatic resins available from Eastman Chemical Company of Kingsport, Tenn., WINGTACK™ ET and EXTRA available from Goodyear Chemical Company, FORAL™, PENTALYN™, AND PERMALYN™ rosins and rosin esters available from Hercules (now Eastman Chemical Company), QUINTONE™ acid modified C5 resins, C5/C9 resins, and acid modified C5/C9 resins available from Nippon Zeon of Japan, and LX™ mixed aromatic/cycloaliphatic resins available from Neville Chemical Company, CLEARON hydrogenated terpene aromatic resins available from Yasuhara. The preceding examples are illustrative only and by no means limiting.

These commercial compounds generally have a Ring and Ball softening point (measured according to ASTM E-28 (Revision 1996)) of about 10-200° C., more preferably about 10-160° C., more preferably about 25-140° C., more preferably about 60-130° C., more preferably about 60-130° C., more preferably about 90-130° C., more preferably about 80-120° C., more preferably about 85-115° C., and more preferably about 90-110° C., wherein any upper limit and any lower limit of softening point may be combined for a preferred softening point range.

Blending

In one or more embodiments, the individual materials and components, such as the SPC, one or more thermoplastic components, additive oils, other additives, plasticizers, etc., may be blended by melt-mixing at a temperature above the melting temperature of the thermoplastic component. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM). The blend may contain additives, which can be introduced into the composition at the same time as the other components or later at down stream in case of using an extruder or Buss kneader or only later in time. Examples of such additives are antioxidants, processing oils, antiblocking agents, antistatic agents, ultraviolet foaming agents, processing aids. Such additives may comprise from about 0.1 to about 10% by weight based on the total weight of blend. The additives can be added to the blend in pure form or in masterbatches. The process oil or plasticizer can be added in one addition or in multiple additions. Preferably, the plasticizers are added after sufficient molten-state mixing of the SPC and the one or more thermoplastic components. After discharge from the mixer, the blend can be processed to form a thermoplastic structure using any one or more following techniques: milling, chopping, extrusion, pelletizing, injection-molding, or any other desirable technique.

Specific Embodiments

Various specific embodiments are described below, at least some of which are also recited in the claims. For example, at least one specific embodiment is directed to a composition (e.g., as disclosed in the summary) that further comprises (includes) additive oil in an amount of from 1 wt % to 30 wt % based on the total weight of the FPC, SPC, the hydrocarbon resin, together with the additive oil. The composition may contain other commonly known additives in amounts from 0 to about 2 wt % (based on the total weight of the blend), such as process aids, heat stabilizers, UV stabilizers, and coloring agents.

One or more of the compositions disclosed herein may have FPC present in the amount of $\leq 60$ wt %, more preferably $\leq 55$ wt %, more preferably $\leq 50$ wt % based on the total weight of the FPC, SPC and hydrocarbon resin. Alternatively, the FPC may be present in an amount of $\leq 45$ wt %, or $\leq 40$ wt %, or $\leq 35$ wt %, or $\leq 30$ wt % and $\geq 25$ wt % or $\geq 20$ wt %, or $\geq 15$ wt %, or $\geq 10$ wt %, or $\geq 5$ wt %, including any range from 5-60 wt % and any intermediate range defined by any lower and any upper limit specified in this paragraph. One or more of the compositions disclosed herein may have SPC present in the amount of 5-95 wt %, more preferably 10-90 wt %, more preferably $\geq 10$ wt % and $\leq 70$ wt % based on the total weight of the FPC, SPC and hydrocarbon resin. Alternatively, the SPC may be present in an amount of $\geq 20$ wt %, or $\geq 25$ wt %, or $\geq 30$ wt %, or $\geq 35$ wt %, or $\geq 40$ wt %, and $\leq 70$ wt %, or $\leq 65$ wt %, or $\leq 60$ wt % and $\leq 55$ wt % or $\geq 50$ wt %, including any range defined by any lower and any upper limit specified in this paragraph for the SPC. Of course it is understood by the skilled person that the sum of the wt % for the FPC, SPC and hydrocarbon resin would equal 100 wt %.

As noted elsewhere herein, certain claims may reflect a specific embodiment that is (or includes) an article formed of any of the above compositions, wherein the article is formed by molding, extrusion, or calendering. Such articles include containers, pipes, tubing and any other suitable article where transparency may be desired.

The composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the too.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendering. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material in injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

Preferred articles made using the compositions herein include: cookware, storageware, toys, medical devices, sterilizable medical devices, sterilization containers, healthcare items, sheets, crates, containers, bottles, packaging, wire and cable jacketing, pipes, geomembranes, sporting equipment, chair mats, tubing, profiles, instrumentation sample holders and sample windows, outdoor furniture (e.g., garden furniture), playground equipment, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles, where suitable transparency is desired.

EXAMPLES 1-12 and COMPARATIVE EXAMPLES 1-4

The following tables refer to various compositions (samples), as well as certain differences in properties based on selected ingredients and proportions.

For purposes of convenience, various specific test procedures are identified in Table 1 for determining properties such as tensile strength, % elongation at break, Shore A Hardness, Shore D Hardness, 100% Modulus, 200% Modulus, and 300% Modulus, and tear strength. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Samples 1-12 included SPC-B, a propylene copolymer formed according to the disclosure herein for making SPC polymers, using a metallocene catalyst, having a 17.46 wt % ethylene (ethylene derived units) with the balance being units derived from propylene. The melting point of SPC-B was about 50° C.; the heat of fusion was about 15 J/g; Mooney Viscosity (ML (1+4) at 125° C.) was 22.7 as measured according to ASTM D 1646. The SPC copolymer was prepared in a 1 liter internal volume Continuous Flow Stirred Tank Reactor. Hexane was used as the solvent. The liquid full reactor had a variable residence time of approximately 9 to 15 minutes and the pressure was maintained at 700 kPa. A mixed feed of hexane, ethylene and propylene was pre-chilled to approximately −30° C. to remove the heat of polymerization before entering the reactor. The solution of catalyst/activator in toluene and the scavenger in hexane were separately and continuously added to the reactor to initiate the polymerization. The reactor temperature was maintained around 70° C. Hexane at 3.56 kg/hr was premixed with both ethylene at rate 60 g/hr and propylene at rate 812 g/hr and fed to the reactor. The polymerization catalyst, dimethyl silyl bridged bis-indenyl hafnium dimethyl, was activated in situ in 1:1 molar ratio with N,N'-Dimethyl anilinium-tetrakis (heptafluoro-1-napthyl) borate and introduced into the polymerization reactor at the rate of 0.0135 g/hr. A dilute solution of triisobutyl aluminum was introduced into the reactor as a scavenger for catalyst terminators. A rate of approximately 1.11 mole of scavenger per mole of catalyst was adequate for this polymerization. After five residence times of steady polymerization, a representative sample of the copolymer produced in this polymerization was collected. The solution of the copolymer was withdrawn from the top, and then steam distilled to isolate the copolymer. The polymerization rate was measured to be about 0.26 kg/hr. The copolymer produced in this polymerization was analyzed for ethylene content by FTIR. The molecular weight averages were measured by GPC. Crystallinity was measured by DSC and the amount of mm triads of propylene residues in the copolymer chain was determined by 13 C NMR.

Each sample 1-12 included OPPERA RP 104, a hydrocarbon resin supplied by ExxonMobil Chemical Co., described above in greater detail. Certain samples included Plastol 542, a process oil, supplied by ExxonMobil Chemical Co. Different polypropylene or polyethylene polymers with different properties (e.g., different MFRs) were included in certain of the samples; the polyethylenes were included for comparison purposes. Exact 5062 is a metallocene catalyzed polyethylene copolymer plastomer having a density of 0.860 and MFR of 0.50 g/10 min. supplied by ExxonMobil Chemical Co. PP HL 512 FB is a high flow homo polypropylene, having an MFR of 1200 g/10 min. (2.16 kg at 230° C.) supplied by Borealis. PP HL 504 FB is a homo polypropylene, having an MFR of 400 g/10 min. (2.16 kg at 230° C.) supplied by Borealis. PP HF 136 MO is a homo polypropylene, having an MFR of 20 g/10 min. (2.16 kg at 230° C.) supplied by Borealis. PP HA 507 is a homo polypropylene, having an MFR of 0.80 g/10 min. (2.16 kg at 230° C.) supplied by Borealis. PP 3546 G is an isotactic homo polypropylene, having an MFR of 2100 g/10 min. (2.16 kg at 230° C.) supplied by ExxonMobil Chemical Co. PP8013 L1 is a reactor polypropylene copolymer, having an MFR of 8 g/10 min. (2.16 kg at 230° C.) supplied by ExxonMobil Chemical Co. ADSYL 5 C 30 F is a random polypropylene terpolymer (with C2 and C4 as comonomers) having MFR of 5.5 g/10 min, supplied by Basell. PP SD 233 CF is a random polypropylene having MFR of 4 g/10 min., supplied by Borealis HM 014 is a high density polyethylene having density of 0.960 and MFR of 4 g/10 min. EOD 99-19 is a syndiotactic polypropylene, having MFR of 20 g/10 min. supplied by TotalFina. LD 605 BA is a LDPE (low density polyethylene), having MFR of 6.5 g/10 min. supplied by ExxonMobil Chemical Co. Escorene UL00328 is EVA (ethylene-vinyl acetate copolymer), having MFR of 3 g/10 min. (ASTM-1238, using 2.16 kg loading at 190° C. and 28 wt % VA) supplied by ExxonMobil Chemical Co. ExxonMobil LL1001 XV is LLDPE (linear low density polyethylene), having butene as a comonomer, with MFR of 1 g/10 min. (ASTM-1238, using 2.16 kg loading at 190° C.).

The determination of the Melt Flow rate (MFR) and the Melt Index of the polymer is according to ASTM D1238 using modification I with a load of 2.16 kg. In this version of the method a portion of the sample extruded during the test was collected and weighed. The sample analysis is conducted at 230° C. with a 1 minute preheat on the sample to provide a steady temperature for the duration of the experiment. In an alternative procedure, the test is conducted in an identical fashion except at a temperature of 190° C. This data is referred to as MI@190° C. or alternatively (MFR@190° C.). MFR data and values presented herein are expressed in units of g/10 min. (2.16 kg @230° C.) unless otherwise indicated.

TABLE 1

| Ingredients | Sample 1 | Sample 2 |
|---|---|---|
| SPC-B | 70% | 60% |
| PP HL 512 FB | 20% | 20% |
| Oppera PR 104 | 10% | 10% |
| Plastol 542 | 0% | 10% |
| Hardness (ISO 868-85) | 70 Sh A | 69 Sh A |
| haze % (TPE-0135) | 14 | 16 |
| 1-perpendicular to flow Tensile (ISO 37 Type2) | | |
| Mod 100 (MPa) | 2.6 | 2.4 |
| Mod 200 (MPa) | 2.9 | 2.7 |
| Mod 300 (MPa) | 3.2 | 3.1 |
| Elongation (%) | 1029 | 1209 |
| Tensile (MPa) | 16.4 | 14.8 |
| Tear N/m (ISO 34B,b) | 49 | 45 |
| 2-parallel to flow Tensile (ISO 37 Type2) | | |
| Mod 100 (MPa) | 2.7 | 2.7 |
| Mod 200 (MPa) | 3.0 | 3.1 |
| Mod 300 (MPa) | 3.6 | 3.6 |
| Elongation (%) | 656 | 642 |
| Tensile (MPa) | 8.2 | 7.2 |
| Tear kN/m (ISO 34B,b) | 49 | 43 |

TABLE 2

| Formulation | Sample 3 | Sample 4 | Sample 5 | Sample 6 | Sample 7 | Sample 8 | Sample 9 |
|---|---|---|---|---|---|---|---|
| SPC-B | 70 | 70 | 70 | 70 | 70 | 70 | 70 |
| Exact 5062 (mPE with d = 0.860 g/cm$^3$ and MFR = 0.5) | — | — | — | — | — | — | — |
| PP HL 512 FB (HPP, MFR = 1200) | 20 | — | — | — | — | — | — |
| PP HL 504 FB (HPP, MFR = 400) | — | 20 | — | — | — | — | — |
| PP HF 136 MO (HPP, MFR = 20) | — | — | 20 | — | — | — | — |
| PP HA 507 (HPP, MFR = 0.8) | — | — | — | 20 | — | — | — |
| PP 3546 G (iPP with MFR = 1200) | — | — | — | — | 20 | — | — |
| PP 8013 L1(RPP, MFR = 8) | — | — | — | — | — | 20 | — |
| ADSYL 5 C 30 F (Ter Random PP, MFR = 5.5 with C2 and C4 as comonomers) | — | — | — | — | — | — | 20 |
| PP SD 233 CF R and PP, MFR = 7) | — | — | — | — | — | — | — |
| HM 014 (HDPE d = 0.960 g/cm$^3$ and MFR = 4) | — | — | — | — | — | — | — |
| EOD 99-19 (sPP, MFR = 20) | — | — | — | — | — | — | — |
| LD 605 BA (MFR = 6.5) | — | — | — | — | — | — | — |
| Escorene UL00328 (MFR = 3 at 190° C., 2.16 kg loading and 28 wt % VA) | — | — | — | — | — | — | — |
| ExxonMobil LL 1001 XV(MFR = 1 at 190° C., 2.16 kg loading)(C4 as comonomer) | — | — | — | — | — | — | — |
| Oppera PR 104 | 10 | 10 | 10 | 10 | 10 | 10 | 10 |

| Parameter | Method | Test Speed/ Conditions | Specimen Size | Units | | | | | | | |
|---|---|---|---|---|---|---|---|---|---|---|---|
| Hardness | ISO 868 | 15 s delay | Disk 2 mm/ 50 mm (thickn./ diameter) | Sh A | 82 | 82 | 83 | 85 | 82 | 77 | 79 |
| haze | ASTM D-1003 | TTRAN | plaque std 2 mm | % | 21 | 14 | 11 | 12 | 13 | 37 | 8 |
| haze of pure PO* | ASTM D-1003 | TTRAN | Pure PP/PE/EVA | % | 88 | 78 | 90 | 82 | — | 99 | — |

| Properties @ RT | | | | | Perpendicular to flow. | Perpendicular to flow. | Perpendicular to flow. | Perpendicular to flow. | Perpendicular to flow. | Perpendicular to flow. | Perpendicular to flow. |
|---|---|---|---|---|---|---|---|---|---|---|---|
| Tensile Strength | ISO 37 | 100 mm/min. | Type 1 dumbbell | MPa | 18.4 | 22.0 | 24.3 | 24.6 | 21.1 | 21.4 | 19.5 |
| Elongation at Break | ISO 37 | 100 mm/min. | 2 mm ISO plaque | % | 987 | 982 | 941 | 909 | 994 | 929 | 866 |
| Modulus @ 100% Strain | ISO 37 | 100 mm/min. | | MPa | 3.3 | 3.2 | 3.3 | 3.5 | 3.3 | 2.9 | 2.6 |
| Tear Strength | ISO 34-Ba | 500 mm/min. | Angle/ without nick 2 mm ISO plaque | kN/m | 53 | 55 | 57 | 59 | 51 | 45 | 48 |

| | | | | | Parallel to flow. | Parallel to flow. | Parallel to flow. | Parallel to flow. | Parallel to flow. | Parallel to flow. | Parallel to flow. |
|---|---|---|---|---|---|---|---|---|---|---|---|
| Tensile Strength | ISO 37 | 100 mm/min. | Type1 dumbbell | MPa | 13.6 | 9.9 | 10.3 | 10.0 | 9.9 | 8.9 | 9.4 |
| Elongation at Break | ISO 37 | 100 mm/min. | 2 mm ISO plaque | % | 815 | 636 | 629 | 479 | 606 | 619 | 592 |
| Modulus @ 100% Strain | ISO 37 | 100 mm/min. | | MPa | 3.4 | 3.5 | 3.9 | 5.0 | 3.5 | 3.4 | 3.4 |
| Tear Strength | ISO 34-Ba | 500 mm/min. | Angle/ without nick 2 mm ISO plaque | kNlm | 55 | 54 | 58 | 52 | 51 | 46 | 48 |

TABLE 3

| Ingredients | Sample 10 | Sample 11 | Sample 12 | Comparative Sample 1 | Comparative Sample 2 | Comparative Sample 3 | Comparative Sample 4 |
|---|---|---|---|---|---|---|---|
| SPC-B | 70 | 70 | 70 | 70 | 70 | 70 | — |
| Exact 5062 (mPE with d = 0.860 g/cm$^3$ and MFR = 0.5) | — | — | — | — | — | — | 70 |
| PP HL 512 FB (HPP, MFR = 1200) | — | — | — | — | — | — | 20 |
| PP HL 504 FB (HPP, MFR = 400) | — | — | — | — | — | — | — |
| PP HF 136 MO (HPP, MFR = 20) | — | — | — | — | — | — | — |
| PP HA 507 (HPP, MFR = 0.8) | — | — | — | — | — | — | — |
| PP 3546 G (iPP with MFR = 1200) | — | — | — | — | — | — | — |

TABLE 3-continued

| | | | | | | | | | | | |
|---|---|---|---|---|---|---|---|---|---|---|---|
| PP 8013 L1(RPP, MFR = 8) | | | | | — | — | — | — | — | — | — |
| ADSYL 5 C 30 F (Ter Random PP, MFR = 5.5 with C2 and C4 as comonomers | | | | | — | — | — | — | — | — | — |
| PP SD 233 CF R and PP, MFR = 7) | | | | | 20 | — | — | — | — | — | — |
| HMA 014 (HDPE d = 0.960 g/cm³ and MFR = 4) | | | | | — | — | — | 20 | — | — | — |
| EOD 99-19 (sPP, MFR = 20) | | | | | — | 20 | — | — | — | — | — |
| LD 605 BA (LPDE MFR = 6.5) | | | | | — | — | — | — | 20 | — | — |
| Escorene UL00328 (MFR = 3 at 190° C., 2.16 kg loading and 28 wt % VA) | | | | | — | — | 20 | — | — | — | — |
| ExxonMobil LL 1001 XV (LLDPE MFR = 1 at 190° C., 2.16 kg loading)(C4 as comonomer) | | | | | — | — | — | — | — | 20 | — |
| Oppera PR 104 | | | | | 10 | 10 | 10 | 10 | 10 | 10 | 10 |

| Parameter | Method | Test Speed/ Conditions | Specimen Size | Units | | | | | | | |
|---|---|---|---|---|---|---|---|---|---|---|---|
| Hardness | ISO 868 | 15 s delay | Disk 2 mm/ 50 mm (thickn./ diameter) | Sh A | 74 | 74 | 62 | 74 | 69 | 69 | 80 |
| haze | ASTM D-1003 | TTRAN | plaque std 2 mm | % | 8 | 16 | 38 | 99 | 78 | 94 | 81 |
| haze | ASTM D-1003 | TTRAN | Pure PP/PE/EVA | % | 84 | 14 | 18 | 99 | 93 | 87 | 88 |

| Properties @ RT | | | | | Perpendicular to flow. | Perpendicular to flow. | Perpendicular to flow. | Perpendicular to flow. | Perpendicular to flow. | Perpendicular to flow. | Perpendicular to flow. |
|---|---|---|---|---|---|---|---|---|---|---|---|
| Tensile Strength | ISO 37 | 100 mm/min. | Type1 dumbbell | MPa | 17.8 | 13.6 | 15.3 | 16.6 | 15.9 | 17.6 | 15.6 |
| Elongation at Break | ISO 37 | 100 mm/min. | 2 mm ISO plaque | % | 911 | 1059 | 983 | 983 | 994 | 961 | 1011 |
| Modulus @ 100% Strain | ISO 37 | 100 mm/min. | | MPa | 2.2 | 2.1 | 1.3 | 2.2 | 1.7 | 1.7 | 2.8 |
| Tear Strength | ISO 34-Ba | 500 mm/min. | Angle/ without nick 2 mm ISO plaque | kN/m | 42 | 35 | 26 | 44 | 32 | 32 | 48 |

| | | | | | Parallel to flow. | Parallel to flow. | Parallel to flow. | Parallel to flow. | Parallel to flow. | Parallel to flow. | Parallel to flow. |
|---|---|---|---|---|---|---|---|---|---|---|---|
| Tensile Strength | ISO 37 | 100 mm/min. | Type 1 dumbbell | MPa | 8.3 | 8.6 | 12.8 | 11.8 | 9.4 | 10.7 | 11.9 |
| Elongation at Break | ISO 37 | 100 mm/min. | 2 mm ISO plaque | % | 632 | 725 | 854 | 825 | 697 | 720 | 785 |
| Modulus @ 100% Strain | ISO 37 | 100 mm/min. | | MPa | 2.9 | 2.2 | 1.5 | 3.1 | 2.4 | 2.4 | 3.4 |
| Tear Strength | ISO 34-Ba | 500 mm/min. | Angle/ without nick 2 mm ISO plaque | kN/m | 42 | 36 | 26 | 42 | 32 | 33 | 47 |

EXAMPLES 13-53

The following materials were used in Examples 13-53. OPPERA PR 103 (softening point 140° C.) is a hydrocarbon resin commercially available from ExxonMobil Chemical Co., Houston, Tex. ESCORENE PP 4292 (MFR of 3 g/10 min.), ESCORENE Achieve 3854 (MFR of 34 g/10 min.), ESCORENE PP 3155 (MFR of 35 g/10 min.), ESCORENE PP 3505 (MFR of 400 g/10 min.), and PP Achieve 3936 (MFR of 1500 g/10 min.) are isotactic polypropylenes having the given MFR and are available from ExxonMobil Chemical Co., Houston, Tex.

70 MFR HPP was a homopolymer made by bulk polymerization of propylene with Ziegler-Natta catalyst system supplied by Toho Tinaium Company under the trade name THC-C-135 and at a donor level of 37 ppm donor (a blend of propyltriethoxy silane and dicyclopentyldimethoxy silane, 95/5 mol %), 5000 ppm of $H_2$, a temperature of 70° C. The melt flow rate (MFR) of the polymer was about 70 g/10 min. The xylene solubles (as measured by dissolving completely the polymer at 145-150° C. in xylene, allowing the solution to cool to the temperature and measuring the polymer in the filtrate after evaporation of the solvent) in the polymer was about 2 wt %. The molecular weight distribution (MWD) or polydispersity index (PDI) as measured by gel permeation chromatography (GPC) in trichlorobenzene was about 4.5. The flexural modulus as measured on the homopolymer pellets nucleated with sodium benzoate at 0.1 wt % and stabilized with antioxidants and injection molded samples was about 270-275 kpsi (1860 to 1900 MPa).

Preparation of SPC

The SPC in the following examples 13-53 was prepared according to the following procedure. In a 27 liter continuous flow stirred tank reactor equipped with a dual pitch blade turbine agitator, 92 kg of dry hexane, 34 kg of propylene, and 1.8 kg of ethylene were added per hour. The reactor was agitated at 650 rpm during the course of the reaction and maintained liquid full at 1600 psig (11 MPa) so that all regions in the polymerization zone had the same composition during the entire course of the polymerization. A catalyst solution in toluene of 1.56 mg of dimethylsilylindenyl dimethyl hafnium and 2.42 mg of dimethylanilinium tetrakis (heptafluoronaphthyl) borate were added at a rate of 6.35 ml/min. to initiate the polymerization. An additional solution of tri-n-octyl aluminum (TNOA) was added to remove extraneous moisture during the polymerization. The polymerization was conducted at approximately 59° C. and the temperature maintained during the polymerization by adding prechilled hexane at a temperature between −3° C. and 2° C. The polymer was recovered by two stage removal of the solvent, first by removing 70% of the solvent using a lower critical solution process as described in WO0234795A1, and then removing the remaining solvent in a LIST devolatization extruder. The polymer was recovered as pellets of 0.32-0.64 cm (about ⅛ to ¼ inch) in principal axes. Composition of the polymer was adjusted by changing the propylene to ethylene ratio in the feed. The molecular weight and MFR was adjusted by the temperature of the polymerization mixture as well as the ratio of the monomer to the polymerization catalyst. Higher polymerization temperature and higher ratio of catalysts to monomer provided with low molecular weight. SPC 1 and SPC 2 in the examples below were made by the general procedure described above. The composition and the MFR of the SPC 2 and SPC 2 are shown below:

| SPC polymer | $C_2$ wt % | MFR @ 230° C. (g/10 min.) |
|---|---|---|
| SPC 1 | 15.5 | 3.2 |
| SPC 2 | 15.0 | 20 |

Blends of the SPC and the FPC (iPP of varying MFR) were blended with the ingredients according to the Table in the examples in an internal Brabender mixer operating at about 50 rpm at a temperature of about 200° C., i.e., 1000 ppm of Irganox 1076, an antioxidant available from Novartis Corporation, New Jersey, USA. In each sample, the component values are given in parts (grams). The compound was then pressed out into a smooth sheet of about 10×10 in. (25.4×25.4 cm) at 200° C. for 15 minutes between Mylar sheets at a pressure of 15 tons about 8 mm thick. Samples for mechanical testing and hardness testing were removed from this sheet. Ultimate Elongation and Ultimate Tensile indicated in the Tables below were measured on the sheets.

Samples for further testing were remolded from the above composition, then allowed to age for 7 days before being analyzed. Samples for tensile testing and hysteresis were molded on a Nissei Plastics Industrial Type PN40 injection molding system. Specimens of the geometry required by ASTM were made directly on this machine. In a typical injection experiment the barrel was maintained at 190° C. and the nozzle was at 200° C. The barrel was injected at 30 cm/min. with a resting time of 18 seconds before the injected part was removed from the mold. Chilled water was circulated around the mold to have an average temperature of about 7° C. A tensile boost of 1.0 sec and a cushion of 8.6 mm was used for this molding operation. Tensile measurements were taken from the molded samples.

The Tables below include a number of sample compositions falling within the scope of at least some claims. Notably, the MFR of each composition is low, e.g., 3 g/10 min. or less (Table 4), or 5 g/10 min. or less (Table 5), or 50 g/10 min. or less (Table 6). Also, SPC is present in major proportions of each composition. Experimental data for samples 14 and 19 demonstrate that doubling the amount of a low MFR polypropylene (ESCORENE 4292) from 10 parts to 20 parts causes the composition to experience an undesirably high increase in haze from 0.012-0.042%/μm (0.30 to 1.07%/mil). By contrast, the data for samples 15 and 20 demonstrate that increasing the amount of a higher MFR polypropylene (PP 3155) by the identical amount (from 10 parts to 20 parts) caused the haze level to increase only slightly, from 0.009-0.011%/μm (0.24 to 0.29%/mil). The other compositions that included polypropylene with high MFR (samples 16-18 and 21-23) similarly maintained haze below 0.039%μm (1.0%/mil) in spite of increasing the amount of the polypropylene to 20 parts. Another property of the compositions having higher MFR polypropylene (samples 15-18) was the high Tc (onset), i.e., above 70° C., and some in particular greater than 80° C. or even 85° C., demonstrating their particular utility for molding and extrusion. The data for Samples 29-33 demonstrate that compositions with 40 parts FPC experienced an undesirably high haze level, regardless of the FPC MFR. However, the data for Samples 25-28 demonstrate that haze levels of below 0.039%/μm (1.0%/mil) were obtained even at FPC levels of 30 parts, whereas Sample 24, which included low MFR polypropylene (3 g/10 min.) experienced an undesirably high haze level of 0.072%/μm (1.82%/mil).

In Tables 4-7, RT was 22° C.±1.5° C. The stress-strain elongation properties of the compounds described herein can be measured according to the ASTM D790 procedure described as follows. Dumbbell shaped samples were fabricated into a cured pad molded into dimensions of 25.4 cm×25.4 cm (10 in×10 in) and removed with a die. The stress strain evaluation of the samples was conducted on an Instron 4465 tester determined for blends at 50.8 cm/min. (20 in/min.), made by Instron Corporation of Canton, Mass. The digital data was collected in a file collected by the Series IX Material Testing System available from Instron Corporation and analyzed using Excel, a spreadsheet program available from Microsoft Corporation of Redmond, Wash.

Tension set can be measured according to the general ASTM D790 procedure by uniaxially deforming a sample to 200% elongation. The tension set was conducted twice in quick succession on the same sample to show the difference in the inherent tension set of the sample (1 st cycle in the examples) and on the sample which has been extended and oriented (2nd cycle in the examples). All extension and retraction was conducted at 50.8 cm/min. (20 in./min.).

The determination of the Shore A of the polymer was done according to ASTM D 2240. In this version of the method a portion of the sample is tested at room temperature. The data was recorded initially and/or 15 seconds after the indentation is created in the sample. Thickness was measured with a hand-held micrometer.

An additional parameter indicated for these blends is the Tc which is the temperature in the cooling cycle when the sample is cooled from 200° C. to −40° C. at which the peak of the crystallization occurs. The peak of the crystallization is indicated by the peak in the heat output of the sample. The Tc is measured during cooling at 20° C./minute and samples with a higher Tc are easier to fabricate into dimensionally stable parts that those which have a low or absent Tc temperature.

Two cycle hysteresis was measured according to the following procedure. A specimen bar for ASTM D790 tensile elongation test was mounted in the jaws of an Instron with a separation of the jaw of 2.54 cm. The sample was extended at 50.8 cm per minute until the separation of the jaws was 7.62 cm. The work needed for this separation was recorded as energy loading (1st cycle) in Joules. The jaws were immediately retracted at the same rate to obtain the same separation as at start of 2.54 cm. The retractive force generated by the sample was monitored during this retraction and the distension of the sample (measured as a percentage of the original separation of the jaws) was recorded as the tension set in %. For the second cycle the sample was extended at the same rate and the separation of the jaws when the retractive force generated by the sample is zero and going positive was measured to be the 'new' separation of the jaws. The sample was extended to three times this separation for a 200% extension of the sample and the work needed for this separation was determined as the energy loading (2nd cycle) in Joules. The jaws were immediately retracted at the same rate to obtain the same separation as at start of 2.54 cm. The retractive force generated by the sample was monitored during this retraction and the distension of the sample (measure as a percentage of the 'new' separation of the jaws) was recorded as the tension set in % for the 2nd cycle.

TABLE 4

| | Sample | | | | | | | | | |
|---|---|---|---|---|---|---|---|---|---|---|
| | 13 | 14 | 15 | 16 | 17 | 18 | 19 | 20 | 21 | 22 |
| Composition | | | | | | | | | | |
| SPC 1 | 250 | 240 | 240 | 240 | 240 | 240 | 230 | 230 | 230 | 230 |
| ESCORENE PP 4292 (MFR = 3 g/10 min.) | | 10 | | | | | | 20 | | |
| ESCORENE PP 3155 (MFR = 36 g/10 min.) | | | 10 | | | | | | 20 | |
| 70 MFR HPP | | | | 10 | | | | | | 20 |
| ESCORENE PP 3505 (MFR = 400 g/10 min.) | | | | | 10 | | | | | 20 |
| ACHIEVE 3936 (MFR = 1500 g/10 min.) | | | | | | 10 | | | | |
| Composition MFR (g/10 min. @ 230° C.) | 2.53 | 2.54 | 2.65 | 2.63 | 2.75 | 3 | 2.43 | 2.65 | 3.12 | 3.04 |
| HAZE(%) | 14.8 | 14.5 | 11 | 13.8 | 9.4 | 10.1 | 46.2 | 17.2 | 11.6 | 12.5 |
| Thickness(μ) | 1205 | 1229 | 1148 | 1153 | 1143 | 1130 | 1099 | 1124 | 1130 | 1124 |
| Haze/μ | 0.0122 | 0.0118 | 0.0094 | 0.0118 | 0.0083 | 0.0091 | 0.0421 | 0.0154 | 0.0102 | 0.011 |
| TENSILE - ELONGATION @ 50.8 cm/min. RT | | | | | | | | | | |
| Mod at 50% elongation (MPa) | 1.38 | 1.63 | 1.73 | 1.95 | 1.72 | 1.74 | 1.69 | 1.84 | 2.23 | 2.01 |
| Mod at 100% elongation (MPa) | 1.57 | 1.84 | 1.96 | 2.18 | 1.93 | 1.96 | 1.91 | 2.06 | 2.46 | 2.25 |
| Mod at 200% elongation (MPa) | 1.69 | 2.01 | 2.18 | 2.42 | 2.13 | 2.18 | 2.16 | 2.36 | 2.77 | 2.56 |
| Mod at 500% elongation (MPa) | 2.86 | 3.71 | 3.89 | 4.13 | 3.73 | 3.80 | 4.35 | 4.44 | 4.84 | 4.46 |
| Ultimate Elongation (%) | 856 | 889 | 901 | 877 | 883 | 903 | 889 | 917 | 892 | 933 |
| Ultimate tensile (MPa) | 9.06 | 11.00 | 11.30 | 11.27 | 10.06 | 11.07 | 11.75 | 12.06 | 12.58 | 11.92 |
| 200% EXTENSION 2 CYCLE HYSTERESIS 50.8 cm/min., RT (average of 2) | | | | | | | | | | |
| Cycle 1 | | | | | | | | | | |
| Energy loading (J) | 1.88 | 2.23 | 2.46 | 2.53 | 2.43 | 2.40 | 2.43 | 2.75 | 2.93 | 2.94 |
| Tension Set (%) | 14.6 | 17.5 | 18.6 | 19.3 | 18.9 | 18.8 | 17.9 | 19.0 | 19.7 | 20.7 |
| Cycle 2 | | | | | | | | | | |
| Energy Loading (J) | 1.46 | 1.71 | 1.87 | 1.95 | 1.85 | 1.82 | 1.83 | 2.05 | 2.13 | 2.16 |
| Tension Set (%) | 8.59 | 9.52 | 9.35 | 8.58 | 9.27 | 9.53 | 10.22 | 9.97 | 9.735 | 10.82 |
| DSC | | | | | | | | | | |
| $1^{st}$ melt (° C.) | 45.9 | 42.3/ 158.9 | 43.2/ 174.3 | 45.8/ 164.0 | 43.5/ 160.0 | 43.0/ 152.1 | 43.3/ 173.5 | 43.5/ 162.9 | 46.0/ 165.9 | 43.5/ 161.7 |
| Tc onset (° C.) | none | 67.96 | 71.05 | 86.30 | 87.00 | 80.44 | 68.9 | 100.8 | 110.7 | 105.6 |
| Heat of freezing (J/g) | none | 4.5 | 4.9 | 6.2 | 5.2 | 4.2 | 5.9 | 8.5 | 10.8 | 8 |
| Shore A Hardness, initial | 65 | 70 | 68 | 68 | 67 | 69 | 67 | 72 | 72 | 71 |

TABLE 5

| | Sample | | | | | | | | | | |
|---|---|---|---|---|---|---|---|---|---|---|---|
| | 23 | 24 | 25 | 26 | 27 | 28 | 29 | 30 | 31 | 32 | 33 |
| Composition | | | | | | | | | | | |
| SPC 1 | 230 | 220 | 220 | 220 | 220 | 220 | 210 | 210 | 210 | 210 | 210 |
| ESCORENE PP 4292 (MFR = 3 g/10 min.) | | 30 | | | | | 40 | | | | |

TABLE 5-continued

| | Sample | | | | | | | | | | |
|---|---|---|---|---|---|---|---|---|---|---|---|
| | 23 | 24 | 25 | 26 | 27 | 28 | 29 | 30 | 31 | 32 | 33 |
| ESCORENE PP 3155 (MFR = 36 g/10 min.) | | | 30 | | | | | 40 | | | |
| 70 MFR HPP | | | | 30 | | | | | 40 | | |
| ESCORENE PP 3505 (MFR = 400 g/10 min.) | | | | | 30 | | | | | 40 | |
| ACHIEVE 3936 (MFR = 1500 g/10 min.) | 20 | | | | | 30 | | | | | 40 |
| Composition MFR (g/10 min. @ 230° C.) | 3.33 | 2.48 | 2.96 | 4.52 | 3.8 | 3.6 | 2.43 | 3.48 | 3.57 | 4.18 | 4.3 |
| HAZE(%) | 14.2 | 78.5 | 38.9 | 24.9 | 14.5 | 15.7 | 85 | 61.4 | 52.7 | 24.7 | 17.6 |
| Thickness (μm) | 1158.0 | 1097.5 | 1104.9 | 1130.3 | 1110 | 1115 | 983.0 | 1097 | 1106.9 | 1129.0 | 1177.8 |
| Haze/μm | 0.0122 | 0.0717 | 0.0350 | 0.0220 | 0.013 | 0.014 | 0.0866 | 0.055 | 0.0476 | 0.0220 | 0.0150 |
| TENSILE - ELONGATION @ 50.8 cm/min. RT | | | | | | | | | | | |
| Mod at 50% elongation (MPa) | 2.18 | 2.01 | 2.23 | 2.51 | 2.54 | 2.65 | 2.22 | 2.60 | 2.68 | 2.80 | 3.11 |
| Mod at 100% elongation (MPa) | 2.42 | 2.26 | 2.47 | 2.78 | 2.79 | 2.88 | 2.49 | 2.93 | 2.99 | 3.06 | 3.32 |
| Mod at 200% elongation (MPa) | 2.76 | 2.68 | 2.92 | 3.25 | 3.22 | 3.25 | 3.03 | 3.63 | 3.59 | 3.56 | 3.51 |
| Mod at 500% elongation (MPa) | 4.68 | 5.44 | 5.72 | 5.94 | 5.47 | 5.21 | 6.03 | 6.54 | 6.64 | 6.01 | 5.80 |
| Ultimate Elongation (%) | 901 | 865 | 845 | 883 | 915 | 931 | 877 | 900 | 873 | 943 | 962 |
| Ultimate tensile (MPa) | 12.33 | 13.04 | 12.31 | 14.54 | 13.51 | 13.50 | 14.45 | 15.19 | 14.47 | 14.50 | 14.46 |
| 200% EXTENSION 2 CYCLE HYSTERESIS 50.8 cm/min., RT | | | | | | | | | | | |
| Cycle 1 | | | | | | | | | | | |
| Energy loading (J) | 2.93 | 2.61 | 2.90 | 3.06 | 3.35 | 3.43 | 3.05 | 3.13 | 3.65 | 3.74 | 4.11 |
| Tension Set (%) | 20.79 | 18.46 | 19.4 | 19.43 | 22.17 | 23.81 | 19.91 | 20.83 | 20.22 | 23.28 | 26.4 |
| Cycle 2 | | | | | | | | | | | |
| Energy Loading (J) | 19.05 | 17.05 | 18.57 | 19.25 | 20.94 | 21.38 | 19.81 | 19.65 | 22.45 | 22.7 | 24.42 |
| Tension Set (%) | 2.15 | 1.93 | 2.10 | 2.18 | 2.37 | 2.42 | 2.24 | 2.22 | 2.54 | 2.57 | 2.76 |
| DSC | | | | | | | | | | | |
| $1^{st}$ melt (° C.) | 45.7/ 155.6 | 43.5/ 161.1 | 43.6/ 154. | 45.1/ 160.8 | 44.0/ 158. | 42.9/ 153.8 | 44.1/ 160.8 | 44.3/ 170.4 | 43.4/ 151 | 43.6/ 159.9 | 40.8/ 153.6 |
| Tc onset (° C.) | 103.7 | 112.4 | 108.4 | 110.4 | 111.7 | 107.5 | 103.1 | 111.6 | 112.8 | 113.8 | 111.2 |
| Heat of freezing (J/g) | 8.6 | 12.4 | 12.5 | 14.5 | 13.1 | 13 | 13 | 18.2 | 17.7 | 17.4 | 17.1 |
| Shore A Hardness (15 sec) | 75 | 68 | 72 | 74 | 71 | 75 | 72 | 76 | 73 | 75 | 75 |

TABLE 6

| | Sample | | | | | | | | | |
|---|---|---|---|---|---|---|---|---|---|---|
| | 34 | 35 | 36 | 37 | 38 | 39 | 40 | 41 | 42 | 43 |
| Composition | | | | | | | | | | |
| SPC-1 | 212.5 | 212.5 | | | 212.5 | 212.5 | | | 212.5 | 212.5 |
| SPC-2 | | | 212.5 | 212.5 | | | 212.5 | 212.5 | | |
| ESCORENE PP 3505 (MFR = 400 g/10 min.) | 37.5 | | 37.5 | | 25 | | 25 | | 15.0 | |
| ACHIEVE 3936 (MFR = 1500 g/10 min.) | | 37.5 | | 37.5 | | 25 | | 25 | | 15 |

TABLE 6-continued

|  | Sample | | | | | | | | | |
|---|---|---|---|---|---|---|---|---|---|---|
|  | 34 | 35 | 36 | 37 | 38 | 39 | 40 | 41 | 42 | 43 |
| OPERRA PR 103 | 25 | 25 | 25 | 25 | 20 | 20 | 20 | 20 | 20 | 20 |
| Composition MFR (g/10 min. @ 230° C.) | 6.8 | 5.0 | 42.8 | 49.4 | 4.5 | 3.9 | 47.6 | 39.8 | 3.9 | 4.2 |
| TENSILE - ELONGATION @ 50.8 cm/min., RT | | | | | | | | | | |
| Mod at 50% elongation (MPa) | 3.56 | 2.92 | 2.59 | 1.81 | 2.58 | 2.37 | 2.39 | 1.88 | 2.22 | 1.84 |
| Mod at 100% elongation (MPa) | 3.94 | 3.35 | 2.77 | 1.98 | 2.99 | 2.82 | 2.56 | 2.05 | 2.58 | 2.15 |
| Mod at 200% elongation (MPa) | 4.65 | 4.13 | 2.99 | 2.14 | 3.73 | 3.60 | 2.77 | 2.22 | 3.18 | 2.61 |
| Mod at 500% elongation (MPa) | 8.95 | 9.42 | 5.03 | 3.34 | 8.46 | 4.25 | 4.56 | 3.52 | 8.00 | 6.39 |
| Ultimate Elongation (%) | 539 | 501 | 784 | 833 | 515 | 497 | 800 | 817 | 538 | 563 |
| Ultimate tensile (MPa) | 9.65 | 9.52 | 9.79 | 7.07 | 8.73 | 8.74 | 9.19 | 7.34 | 8.89 | 8.08 |
| 200% EXTENSION 2 CYCLE HYSTERESIS @ 50.8 cm/min., RT | | | | | | | | | | |
| Cycle 1 | | | | | | | | | | |
| Energy loading (J) | 4.76 | 4.18 | 3.42 | 2.43 | 3.75 | 3.32 | 3.20 | 2.47 | 3.05 | 2.85 |
| Tension Set (%) | 24.2 | 21.8 | 25.6 | 21.5 | 20.2 | 17.3 | 24.4 | 20.5 | 16.7 | 15.5 |
| Cycle 2 | | | | | | | | | | |
| Energy Loading (J) | 3.11 | 2.89 | 2.27 | 1.67 | 2.68 | 2.47 | 2.16 | 1.71 | 2.31 | 2.17 |
| Tension Set (%) | 11.0 | 9.5 | 12.5 | 10.3 | 8.4 | 6.6 | 12.0 | 9.7 | 6.6 | 6.1 |
| DSC | | | | | | | | | | |
| $1^{st}$ melt (° C.) | 42.8 | 44.0 | 44.6 | 46.5 | 43.5 | 44.0 | 44.0 | 46.6 | 45.0 | 45.6 |
| Tc onset (° C.) | 109.5 | 101.7 | 106.4 | 86.5 | 103.5 | 89.1 | 104.2 | 74.2 | 100.2 | 65.4 |
| Tc heat of freezing (J/g) | 15.7 | 13.7 | 11.3 | 6.6 | 9.5 | 7.9 | 11.0 | 5.1 | 9.3 | 2.5 |
| Shore A Hardness (15 Sec) | 72.4 | 72 | 67.2 | 59.4 | 69.2 | 66 | 66.6 | 61.0 | 62.6 | 61.8 |
| HAZE(%) | 9.4 | 9.0 | 6.2 | 6.1 | 5.5 | 4.7 | 5.7 | 11.5 | 4.2 | 4.4 |
| Thickness (μm) | 1242.1 | 1224.3 | 1198.9 | 1145.5 | 1234.4 | 1226.8 | 1183.6 | 1178.6 | 1216.7 | 1221.7 |
| Haze/μm | 0.0075 | 0.0075 | 0.0051 | 0.0055 | 0.0043 | 0.0039 | 0.0047 | 0.0098 | 0.0035 | 0.0035 |

TABLE 7

|  | Sample | | | | | | | | | |
|---|---|---|---|---|---|---|---|---|---|---|
|  | 44 | 45 | 46 | 47 | 48 | 49 | 50 | 51 | 52 | 53 |
| Composition | | | | | | | | | | |
| SPC-1 | | | 212.5 | 212.5 | | | 212.5 | 212.5 | | |
| SPC-2 | 212.5 | 212.5 | | | 212.5 | 212.5 | | | 212.5 | 212.5 |
| ESCORENE PP 3505 (MFR = 400 g/10 min.) | 15 | | 10 | | 10 | | 15 | | 15 | |
| ESCORENE ACH3936 (MFR = 1500 g/10 min.) | | 15 | | 10 | | 10 | | 15 | | 15 |
| OPERRA PR103 | 20 | 20 | 20 | 20 | 20 | 20 | 40 | 40 | 40 | 40 |
| Composition MFR (g/10 min. @ 230° C.) | 35.8 | 36.2 | 5.2 | 4.0 | 41.5 | 36.2 | 4.9 | 4.4 | 24.2 | 45.9 |
| TENSILE - ELONGATION @ 50.8 cm/min., RT | | | | | | | | | | |
| Mod at 50% elongation (MPa) | 2.05 | 2.03 | 2.08 | 1.75 | 2.11 | 1.79 | 2.06 | 1.87 | 1.94 | 1.73 |
| Mod at 100% elongation (MPa) | 2.22 | 2.20 | 2.51 | 2.07 | 2.27 | 1.95 | 2.46 | 2.29 | 2.14 | 1.90 |
| Mod at 200% elongation (MPa) | 2.39 | 2.41 | 3.17 | 2.49 | 2.43 | 2.08 | 3.07 | 2.87 | 2.33 | 2.06 |
| Mod at 500% elongation (MPa) | 3.87 | 3.96 | 7.96 | 5.55 | 3.85 | 3.13 | 6.99 | 6.20 | 3.77 | 3.08 |
| Ultimate Elongation (%) | 824 | 827 | 530 | 602 | 824 | 849 | 585 | 546 | 820 | 862 |
| Ultimate tensile (MPa) | 7.96 | 7.97 | 8.58 | 8.14 | 7.89 | 6.77 | 8.96 | 7.08 | 7.55 | 6.57 |
| 200% EXTENSION 2 CYCLE HYSTERESIS @ 50.8 cm/min., RT | | | | | | | | | | |
| Cycle 1 | | | | | | | | | | |
| Energy loading (J) | 2.76 | 2.62 | 3.03 | 2.55 | 2.76 | 2.33 | 2.92 | 2.73 | 2.57 | 2.35 |
| Tension Set (%) | 22.1 | 21.3 | 16.3 | 14.7 | 21.4 | 20.1 | 17.7 | 16.1 | 19.8 | 21.4 |

TABLE 7-continued

| | Sample | | | | | | | | | |
|---|---|---|---|---|---|---|---|---|---|---|
| | 44 | 45 | 46 | 47 | 48 | 49 | 50 | 51 | 52 | 53 |
| Cycle 2 | | | | | | | | | | |
| Energy loading (J) | 1.90 | 1.81 | 2.29 | 1.95 | 1.84 | 1.59 | 2.14 | 2.05 | 1.80 | 1.59 |
| Tension Set (%) | 10.2 | 10.1 | 6.2 | 5.8 | 10.5 | 9.5 | 6.8 | 5.7 | 9.8 | 10.2 |
| DSC | | | | | | | | | | |
| 1st melt (° C.) | 45.6 | 45.8 | 44.8 | 45.1 | 45.8 | 47.0 | 45.0 | 45.6 | 46.3 | 46.8 |
| Tc on set (° C.) | 97.1 | 113.9 | 93.7 | 65.2 | 92.3 | 61.3 | 90.0 | 62.8 | 94.2 | 86.2 |
| Tc heat of freezing (J/g) | 8.2 | 6.8 | 2.6 | 2.7 | 5.6 | 4.3 | 6 | 2.8 | 9 | 4.1 |
| Shore A Hardness (15 sec) | 64.6 | 64.0 | 64.2 | 60.0 | 64.2 | 61.6 | 63.0 | 60.2 | 62.2 | 59.2 |
| HAZE(%) | 5.2 | 10.7 | 3.4 | 4.3 | 5.6 | 5.4 | 3.8 | 3.8 | 10.6 | 7.2 |
| Thickness (μm) | 1176.0 | 1176.0 | 1221.7 | 1231.9 | 1165.9 | 1173.5 | 1089.7 | 1219.2 | 1178.6 | 1163 |
| Haze/μm | 0.0043 | 0.0091 | 0.0028 | 0.0035 | 0.0047 | 0.0047 | 0.0035 | 0.0031 | 0.0091 | 0.006 |

Another property of interest is the MFR of the FPC, e.g., the polypropylene, having a melting point of 110° C. or higher. It has been discovered that the MFR of the FPC plays a surprising role in the properties of the composition. A composition that includes a low MFR FPC (e.g., polypropylene), e.g., ≦5 or even ≦10 may be restricted in the amount of polypropylene that can be incorporated, since certain amounts of such polypropylene cause a loss in beneficial properties. Preferred compositions herein have a haze value<0.039%/μm (1.0%/mil), more preferably ≦0.035%/μm (0.9%/μmil), more preferably ≦0.030%/μm (0.75%/mil), and more preferably ≦0.020%/μm (0.5%/mil). Certain compositions having such a haze value include FPC in particular amounts and having particular MFR ranges. It has been discovered that the haze of a composition is influenced by the amount of FPC (e.g., polypropylene) and also by the MFR of the FPC. Lower limits of the amount of FPC are described elsewhere herein, e.g., 5 wt % or more, or 10 wt % or more, or 15 wt % or more; and such amounts of FPC contribute to excellent mechanical properties, e.g., good Tensile Strength. However, too much FPC can cause undesirably high haze levels, e.g., above 0.039%/μm (1.0%/mil). That is, haze is influenced by FPC amount (and FPC MFR as discussed later).

More specifically, in certain embodiments, a composition that includes 40 parts FPC (~17.5 wt %) suffers from an undesirably high haze (greater than 0.039%/μm (1.0%/μmil)). See Samples 29-31 in Table 5. More acceptable haze levels can be reached using less FPC, and the amount of FPC corresponding to such haze levels has been discovered to depend on the MFR of the FPC. A composition that includes a high MFR FPC (higher than 25 g/10 min.) can accommodate more polypropylene without experiencing an undue increase in haze than can a composition with a lower MFR FPC. For example, a composition containing 30 parts FPC suffers from high haze (greater than 0.039%/μm (1.0%/mil)) when the FPC has a low MFR (less than 25 g/10 min., e.g., 3 g/10 min.) but a composition containing 30 parts FPC has good (low) haze levels (less than 0.039%/μm (1.0%/mil)) when the FPC has a high MFR (greater than 25 g/10 min., e.g., 36, or 400, or 1500 g/10 min.). Thus, a high MFR FPC leads to surprisingly good haze levels. See Samples 24-27 in Table 5. Surprisingly, the difference between good and bad haze levels is more a function of the FPC MFR than of the MFR of the overall composition.

We claim:

1. A composition consisting essentially of:
   from 5 to 30 wt %, by weight of the composition, of a first polymer component (FPC) comprising greater than 25 wt % propylene, the FPC having a MFR@ 230° C. ≧about 25 g/10 mm and a melting temperature of ≧about 110° C.;
   a second polymer component (SPC) comprising 6-25 wt % ethylene and 75-94 wt % propylene based on the weight of propylene and ethylene, the SPC having a triad tacticity of from about 50% to about 99% and MFR@230° C.≦about 800 g/10 mm; and
   a hydrocarbon resin.

2. The composition according to claim 1 wherein the SPC comprises from 75-93 wt % propylene and from 7-25 wt % ethylene based on the combined weight of propylene and ethylene in the SPC.

3. The composition according to claim 2 wherein the SPC comprises from 82.5-93 wt % propylene and from 7-17.5 wt % ethylene based on the combined weight of propylene and ethylene in the SPC.

4. The composition according to claim 1 wherein the MFR of SPC is ≦about 500 g/10 mm.

5. The composition according to claim 4 wherein the MFR of SPC is ≦about 200 g/10 mm.

6. The composition according to claim 5 wherein the MFR of SPC is ≦about 100 g/10 mm.

7. The composition according to claim 6 wherein the MFR of SPC is ≦about 50 g/10 mm.

8. The composition according to claim 1 wherein the MFR of SPC is from about 1-25 g/10 mm.

9. The composition according to claim 8 wherein the MFR of SPC is from about 1-20 g/10 mm.

10. The composition according to claim 1 wherein the MFR of the FPC is ≧about 25 g/10 mm.

11. The composition according to claim 10 wherein the MFR of the FPC is ≧about 27 g/10 mm.

12. The composition according to claim 11 wherein the MFR of the FPC is ≧about 30 g/10 mm.

13. The composition according to claim 1 wherein the SPC has a heat of fusion≦50 J/g.

14. The composition according to claim 13 wherein the SPC has a heat of fusion≦40 J/g.

15. The composition according to claim 1 wherein the hydrocarbon resin has an initial YI color≦5.

16. The composition according to claim 15 wherein the hydrocarbon resin has an initial YI color≦3.

17. The composition according to claim 1 wherein the SPC has a molecular weight distribution (MWD) of from about 1.0 to about 5.0.

18. The composition according to claim 17 wherein the SPC has a molecular weight distribution (MWD) of from about 1.5 to about 3.5.

19. The composition according to claim 1 comprising 1-30 wt % hydrocarbon resin based on the weight of the composition.

20. The composition according to claim 1 wherein the hydrocarbon resin comprises a hydrogenated dicyclopentadiene-based hydrocarbon resin.

21. The composition according to claim 1 wherein the FPC is an isotactic polypropylene containing at least 90 wt % propylene.

22. The composition according to claim 1 wherein the FPC is a propylene homopolymer, a propylene copolymer, or a propylene block copolymer.

23. The composition according to claim 1 wherein the SPC further comprises a diene-based unit.

* * * * *

UNITED STATES PATENT AND TRADEMARK OFFICE
CERTIFICATE OF CORRECTION

PATENT NO.       : 7,655,730 B2                                          Page 1 of 1
APPLICATION NO.  : 11/402333
DATED            : February 2, 2010
INVENTOR(S)      : Datta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-third Day of November, 2010

David J. Kappos
*Director of the United States Patent and Trademark Office*